US005730359A

United States Patent [19]

Würth

[11] Patent Number: 5,730,359

[45] Date of Patent: Mar. 24, 1998

[54] APPLICATOR HEAD FOR METERED RELEASE OF FLOWING MEDIA

[75] Inventor: Heiko Würth, Oberursel, Germany

[73] Assignee: ITW Dynatec GmbH Klebetechnik, Mettmann, Germany

[21] Appl. No.: 664,069

[22] Filed: Jun. 13, 1996

[30] Foreign Application Priority Data

Jun. 13, 1995 [DE] Germany ........................ 195 21 478.1

[51] Int. Cl.[6] ............................ A01G 25/02; B05B 1/08; B05B 1/24; F16K 11/10

[52] U.S. Cl. ............................ 239/66; 239/99; 239/124; 239/135; 239/563; 137/867; 137/870; 251/129.06

[58] Field of Search ................................ 239/66, 99, 124, 239/135, 551, 562, 563; 137/596.17, 867, 870; 251/129.06

[56] References Cited

U.S. PATENT DOCUMENTS

| | | | |
|---|---|---|---|
| 4,250,924 | 2/1981 | Sakakibara et al. | 137/870 X |
| 4,617,969 | 10/1986 | Weiger et al. | 251/129.06 X |
| 5,040,567 | 8/1991 | Nestler et al. | 137/870 X |
| 5,328,149 | 7/1994 | Reuter | 251/129.06 |

FOREIGN PATENT DOCUMENTS

GM 94 05 600.5 of 0000 Germany .

*Primary Examiner*—Andres Kashnikow
*Assistant Examiner*—Robin O. Evans
*Attorney, Agent, or Firm*—Schwartz & Weinrieb

[57] ABSTRACT

An applicator head for the metered release of flowing media, particularly hot-melt glues, cold glue paste, lubricants, paints, or similar substances, comprises a housing within which there is disposed a pivoting rocker having two oppositely disposed rocker arms which are operatively associated with two valve mechanisms. Two stacks of piezoelectric elements are disposed upon opposite sides of a rocker axis such that when a particular one of the stacks of piezoelectric elements is energized or activated, the rocker is pivoted about the rocker axis whereby one of the valves is opened while the other valve is simultaneously closed. In accordance with one embodiment of the invention, one of the valves is an applicator or dispensing valve and the other one of the valves is a closing or recirculation valve operatively connected to a recirculation system. In accordance with a second embodiment of the invention, both valves are applicator or dispensing valves. In either case, the provision of the two valves and the simultaneous opening of one valve and the closing of the other valve permits the pressure levels within the system, and at the applicator or dispensing valves, to be rendered substantially constant or uniform whereby in view of the elimination of pressure variations within the system and at the applicator or dispensing valves, the amount and formation of the media, such as, for example, the hot-melt glue, discharged or deposited upon a substrate is rendered substantially uniform.

20 Claims, 3 Drawing Sheets

APPLICATOR HEAD FOR METERED RELEASE OF FLOWING MEDIA

FIELD OF THE INVENTION

The present invention relates to an applicator head for the metered release of flowing media, particularly hot-melt glues, cold glue paste, lubricants, paints or similar substances, having a housing in which there is a pivoting rocker which acts on at least one valve element, preferably two valves, which rocker is driven by means of two piezoelectric elements arranged on opposite sides of a rocker joint.

BACKGROUND OF THE INVENTION

An applicator head similar to that described above is already known from DE-GM [utility model] 94 05 600.5, previously developed by the applicant. It serves, for example, for applying hot-melt glue onto a substrate consisting of cardboard, paper, a textile, or a non-woven or a similar material. In this connection, the substrate, in strip form, is conducted past the fixed applicator head. The valve described there has the advantage that the piezo-electric valve drive consists of only two piezoelectric elements when there is automatic temperature compensation, with the slight length change of each piezoelectric element being converted into a relatively large valve stroke by means of a transfer or conversion of the movement proceeding from the two piezo elements as performed by a rocker construction. Furthermore, this valve drive develops a large valve force of approximately 3000N, with the time for an opening and closing cycle amounting to only 0.8 to 0.25 msec.

OBJECT OF THE INVENTION

The task of the present invention now consists of creating a new applicator head which has greater throughput performance and application capacity, and guarantees uniform glue application.

SUMMARY OF THE INVENTION

The foregoing and other objectives are accomplished by means of the present invention according to which the rocker has at least one rocker arm on opposite sides of the rocker joint, with at least one valve element arranged on each one of these arms.

The solution according to the present invention has the basic advantage that by designing the valve drive as a double rocker, the theoretical application performance can be more than doubled, while at the same time all the advantages of the state of the art as indicated above continue to apply to applicator head according to the present invention.

In a preferred embodiment, because the second application valve necessarily opens at the moment when the present application valve closes, pressure variations in the glue circulation system are avoided to a great extent, in a particularly advantageous manner.

Because of the avoidance of pressure variations within the closed hot-melt glue system, according to the present invention there is uniform circulation of the hot-melt glue within the circulation channel. This also prevents the hot-melt glue from burning in the heated part of the applicator head, and likewise prevents baked-on or hardened deposits from forming within the circulation channel.

Finally, in summary, this means that the hot-melt glue volume flow is made constant during the entire opening cycle of an application valve, so that the glue application has the desired shape.

In an advantageous embodiment of the invention, the additional valve element does not serve to control another application valve, but rather acts on a valve which is arranged within a closed circulation system for the liquid medium provided with a pump.

This preferred embodiment of the invention has particular advantages if a large number of individual substrates, for example pre-cut cardboard pieces, are to be coated within a predetermined time period. In this connection it is sometimes necessary for the interstices between the individual pre-cut cardboard pieces and/or between areas which are to be coated with dots of glue, to be bridged. In accordance with the preferred embodiment of the present invention, it is possible, without any problems, to keep the application valve closed for a certain period of time, with the hot-melt glue circulation valve, which opens at the same time that the application valve closes, preventing a pressure increase in the hot-melt glue system. If the next area to be coated or the next pre-cut cardboard piece now reaches the position of the application valve, the latter can be opened again, with the hot-melt glue circulation valve closing at the same time. However, during the entire opening cycle, essentially the same pressure prevails at the application valve, and therefore the volume flow of hot-melt glue is always essentially constant.

In accordance with another particularly advantageous embodiment of the invention, the piezoelectric elements which drive the rocker construction are connected with an on-line power supply, which essentially consists of an accumulator and related electronics, which determines the position of the application valve, in each instance, in case of a power failure, and corrects the closing state. This particularly preferred embodiment, according to the present invention, simultaneously offers an automatic protection against run-out, since it guarantees that the application valve will always be in the completely closed state even in case of a power failure.

BRIEF DESCRIPTION OF THE DRAWINGS

Various other objects, features, and attendant advantages of the present invention will be evident from the following detailed description of an exemplary embodiment in which like reference characters designate like or corresponding parts throughout the several views, and wherein.

DETAILED DESCRIPTION OF THE ILLUSTRATED EMBODIMENTS

Figure 1:
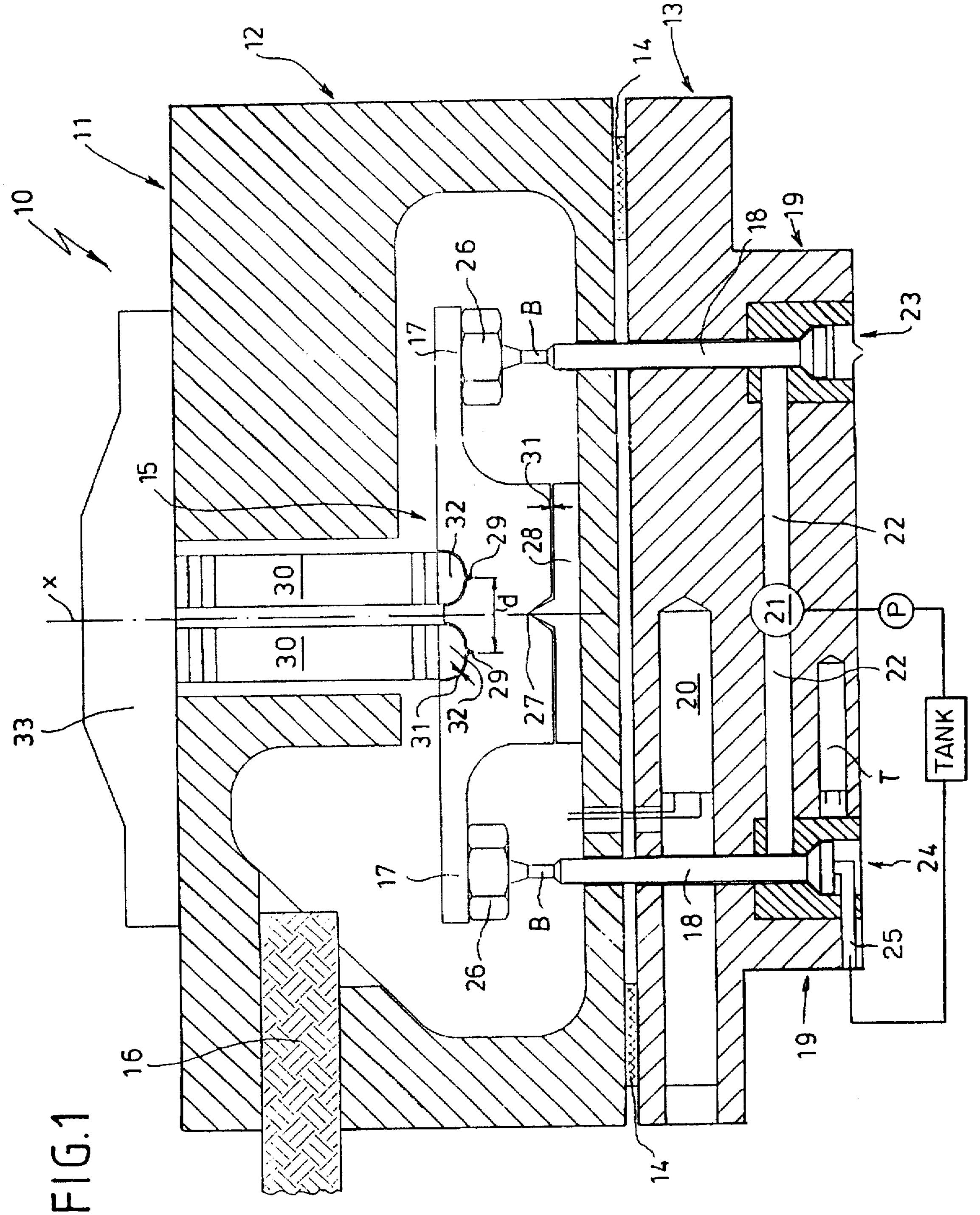
FIG. 1 is a simplified longitudinal cross-sectional view through an applicator head constructed in accordance with the present invention and showing its cooperative parts.

In the drawings, an applicator head for the metered release of hot-melt glue is designated, as a whole, with the reference number 10.

The applicator head has a housing 11 with housing parts 12 and 13. Between the housing parts 12 and 13, there is a thermal separating layer 14. A valve drive 15 structured as a double rocker, electronic components (not shown in FIG. 1) and an electrical supply and control line 16 are arranged in the housing part 12. The double rocker 15 has two rocker arms 17, with a rod-shaped valve element 18 arranged at the free end of each arm 17, and; the valve element 18 projects through the thermal separating layer 14 into the housing part 13, all the way into a valve head 19. Furthermore, a heating device 20 as well as the common feed channel 21 for hot-melt glue are arranged in the housing part 13. The feed channel 21 is connected with the valve heads 19 by means of hot-melt glue channels 22 in each instance. Finally, a temperature sensor T can be seen below the hot-melt glue channels 22. While the one valve head 19 contains an applicator valve 23, the other valve head 19 comprises as a closing valve 24 for a hot-melt glue feed-back line 25, which produces a connection with a hot-melt glue pump P through a hot-melt glue TANK. This hot-melt glue pump P is, in turn, connected with the feed channel 21, so that a closed hot-melt glue system is present.

While the valve elements 18 are attached at the free ends of the rocker arms 17, by means of a bending cardanic element B and a screw connection 26, in each instance, the double rocker 15 itself is connected with the base part 28 by means of a joint 27. On both sides above the joint 27, two piezoelectric elements 30 are connected with the double rocker 15, also by means of joints 29. The jointed connection of the double rocker 15 to the base part 28 and to the piezoelectric elements 30 involves connections by means of the material of the parts. These thin, material joint connections 27, 29 are created in that the aforementioned parts are produced together, from a single component, using the spark erosion method. For example, there is a continuous gap 31 between the double rocker 15 and the base part 28, except for a flexible, narrow material bridge comprising joint 27, which gap allows relative movement of the double rocker 15 with respect to the base part 28 on both sides. In the same manner, connecting parts 32, which in turn are glued onto the piezoelectric elements 30, are each connected with the double rocker 15 by means of a flexible, narrow material bridge comprising joint 29, with a narrow gap 31 also being present on both sides of this material bridge 29.

The piezoelectric elements 30, which are composed of approximately 200 0.1 mm thick ceramic disks that are glued together, make contact with a resilient cover plate 33, attached with screws (not shown), at their ends facing away from the double rocker 15.

The piezoelectric elements 30 are connected to the double rocker 15 by joints 29, on both sides of a vertical axis x which runs through the joint 27, at a distance d in each instance. This results in automatic temperature compensation in combination with the resilient mounting of the piezoelectric elements 30 on the resilient cover plate 33.

If the piezoelectric elements 30 alternately expand when impressed with voltage, the double rocker 15 has torque applied to it, alternately in the clockwise and counterclockwise direction, causing one rocker arm 17 and the valve element 18 connected to it in each instance to move up, and the other rocker arm 17 to move down. With this double rocker arrangement, the application valve 23 and the closing valve 24 can be alternately opened, in the embodiment, with the other valve being closed, in the opposite direction. Because pressure peaks are prevented as a result, there is a relatively continuous out-flow of hot-melt glue during the opening cycle of the application valve 23, guaranteeing a clean application of glue to the substrate. More particularly, because the closing valve 24 necessarily opens at substantially the same time that the application valve 23 closes, pressure variations in the glue applicator system are avoided to a great extent, in a particularly advantageous manner, and because of the avoidance of pressure variations within the closed hot-melt glue system, according to the invention, there is uniform circulation of the hot-melt glue within the circulation channel 25. This also prevents the hot-melt glue from burning in the heated part of the applicator head 10, and prevents baked-on or hardened deposits from forming within the circulation channel 25. This also means that the hot-melt glue volume flow is essentially constant during the entire opening cycle of the application valve 23, as well as with respect to separate cycles of the valve 23, so that the glue application or deposition has the desired volume or shape.

This preferred embodiment of the invention has particular advantages if a larger number of individual substrates, for example, pre-cut cardboard pieces, are to be coated within a time unit. In this connection, it is sometimes necessary for the interstices between the individual pre-cut cardboard pieces and/or between areas which are to be coated with dots of glue, to be bridged. In the preferred embodiment of the invention, it is possible without problems to keep the application valve 23 closed for a certain period of time, with the hot-melt glue circulation valve 24, which opens at the same time that the application valve 23 closes, preventing a pressure increase or build-up within the hot-melt glue system and at or within the vicinity of the application valve 23. If the next area to be coated or the next pre-cut cardboard piece now reaches the position of the application valve 23, the latter can be opened again, with the hot-melt glue circulation valve 24 closing at the same time. However, during the entire opening cycle, essentially the same pressure prevails at the application valve 23, and therefore, the volume flow of hot-melt glue is also essentially constant. In this manner, the elimination of the pressure build-up prevents the undesirable discharge or deposition of large globs of the hot-melt glue at the beginning of a deposition cycle.

The control and regulation of the two piezoelectric elements 30 is performed by special valve electronics 34, which are essentially arranged in the housing part 12 shown in FIG. 1. The valve electronics 34 shown in the block schematic of FIG. 2 allow alternate application of voltage to the two piezoelectric elements 30, on the one hand, and particularly low-energy operation of the application head 10, which therefore results in only slight heat losses, on the other hand.

Figure 2:
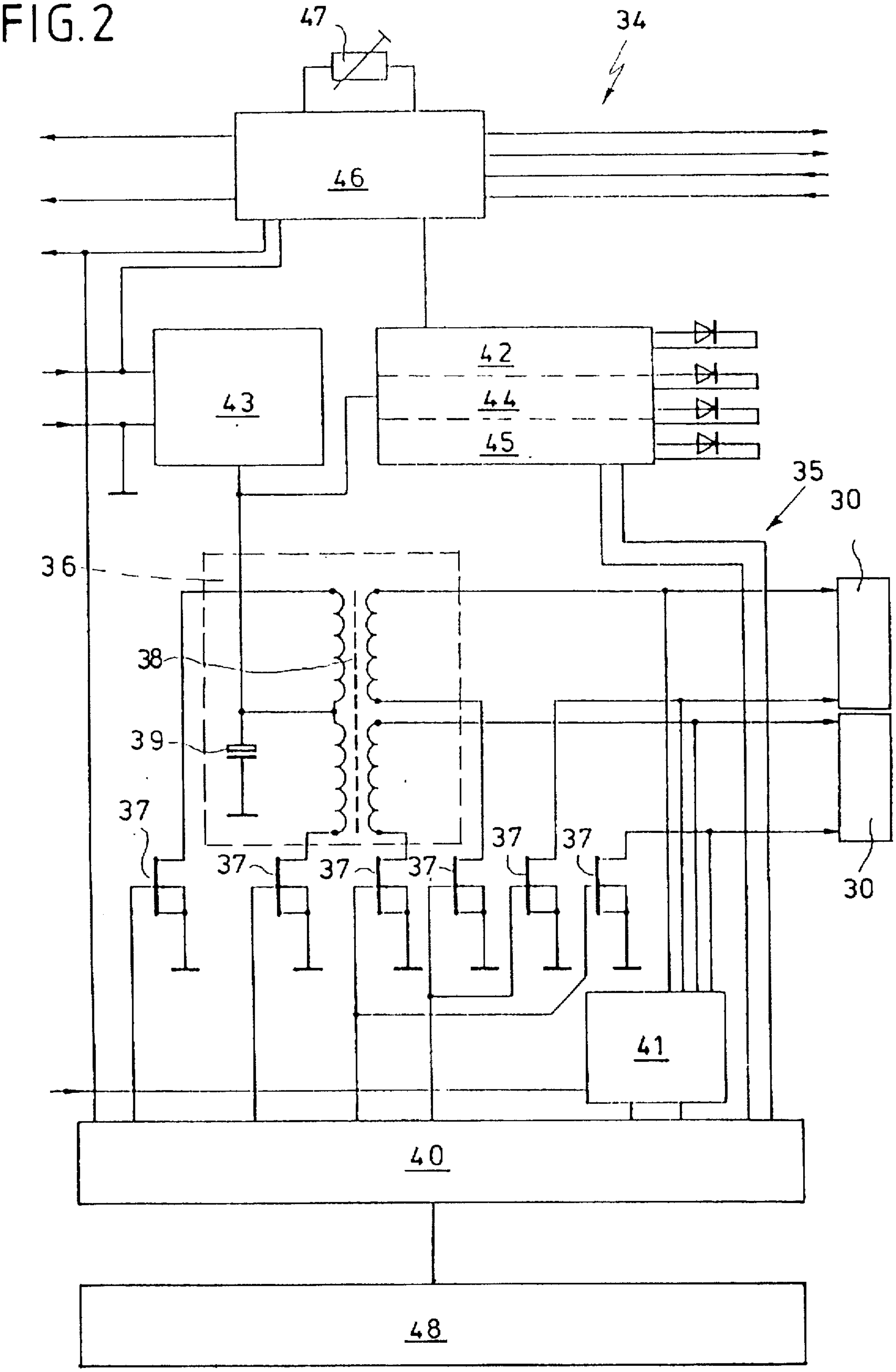
FIG. 2 is a simplified block schematic diagram of the valve electronics.

Particularly for the purpose of reduced energy consumption, the valve electronics 34 have a so-called charge pump arrangement 35, which is basically shown in FIG. 2. The charge pump arrangement 35 has an intermediate storage 36 and several power field effect transistors 37, where the intermediate storage 36 and the power field effect transistors 37 are connected with both piezoelectric elements 30 in each instance. The intermediate storage 36 contains a coil 38 and a capacitor 39. The energy savings are achieved in the operation of the piezoelectric elements 30, by means of the recharging principle which can be used for the so-called counter-cycle arrangement of the piezoelectric elements 30.

Basically, this recharging principle means that the energy (charge) stored in one piezoelectric element 30 at a specific time is transformed to the other piezoelectric element 30 "in portions." Basically, this is done within the charge pump arrangement 35, in that on the one hand, the charge of a piezoelectric element 30 is temporarily stored in the intermediate storage 36, and that on the other hand, the power field effect transistors 37 transform the stored energy to the other piezoelectric element 30 in each instance, by means of targeted switching of different networks. The time sequence of the recharging processes and the switching state of the power field effect transistors 37 at any time is determined by a programmable control 40. However, a regulation circuit 41 also acts on the programmable control 40, which constantly checks the reference value/actual value comparison of the voltage state of the individual piezoelectric elements 30.

With this recharging principle, it is possible for the energy present in a piezoelectric element 30 to be fed back into the primary circuit and then used again to excite the other piezoelectric element 30 in each instance.

However, since a small portion of the energy is converted to heat in these electronic processes, and furthermore, since a large part of the electrical energy is converted to mechanical energy, there is the constant need to balance out this energy deficit. This is done with the energy provided by the switch regulator 43 and the internal power supply 42.

Furthermore, the valve electronics 34 have a cycle generator 44 and a status display 45, but these are arranged outside of the applicator head 10. While the cycle generator 44—as its name denotes—determines the cycle for the electronic processes which are taking place, the status display 45 is an optical display for the operator.

The valve electronics 34 also have a temperature regulator 46, which regulates the valve temperature to the temperature set at the reference value potentiometer 47. This means that a temperature sensor T, arranged below the heating cartridge 20 constantly measures the valve temperature. Only if this temperature agrees with the temperature present at the reference value potentiometer 47, and therefore the working temperature prevails, will the programmable control release the valve.

In order for the valve drive 15 which is structured as a double rocker not to go into an adverse position in case of a power failure, allowing hot-melt glue to flow out of the application valve 23, the valve electronics 34 are finally equipped with an on-line power supply 48 which essentially consists of an accumulator and electronics which determine the current status of the application valve 23 and ensure that it closes completely.

Figure 3:
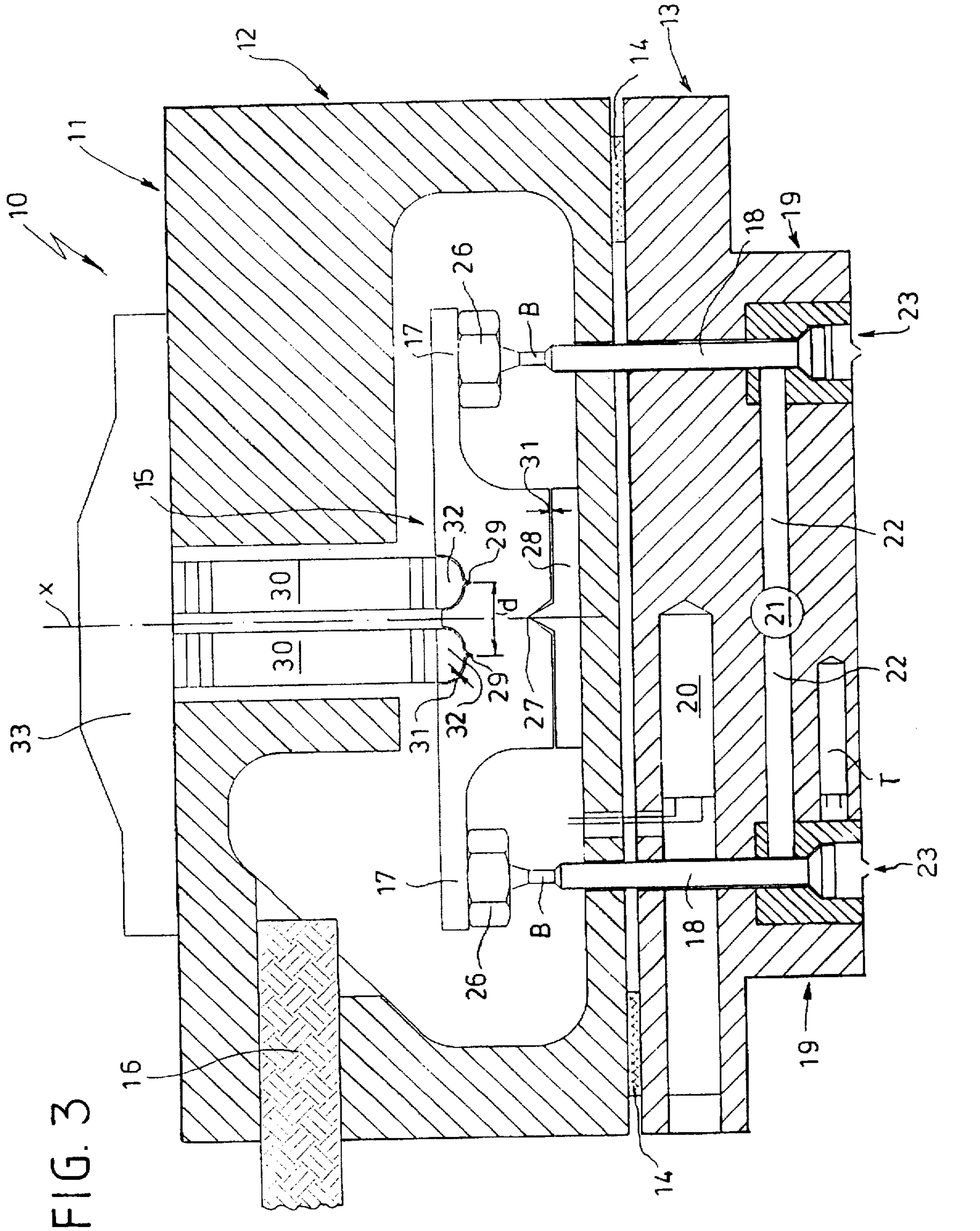
FIG. 3 is a simplified longitudinal cross-sectional view through a second embodiment of an applicator head.

Referring now to FIG. 3, a second embodiment of the present invention is disclosed wherein the closing or recirculation valve 24 has been replaced by a second application valve 23. The operation of this embodiment is essentially the same as that of FIG. 1 in that the two stacks of piezoelectric elements 30,30 control the opening and closing cycles of the two application valves 23,23 in an alternative fashion when the stacks of piezoelectric elements 30 are selectively energized or activated, and it may be appreciated that in lieu of the pressure variations attendant the opening and closing cycles of the application valves 23,23 being controlled or rendered uniform by means of a recirculation system similar to that disclosed within the embodiment of FIG. 1, the pressure levels within the system of FIG. 3 are maintained essentially constant in view of the opening of one of the application valves 23 and the closing of the other one of the application valves 23. Of course, additional valving and recirculation means similar to that disposed within the embodiment of FIG. 1 may be incorporated within the system of FIG. 3 and in conjunction with the feed channel 21 and the two application valves 23,23 so as to prevent any severe or substantial pressure variations or build-up in pressure within the system when, for example, the application valves 23,23 are not in fact used or cycled for a substantial period of time. The provision of the two application valves 23,23 within this embodiment of the invention permits the system to perform different hot-melt glue application or deposition operations or achieve different hot-melt glue application or deposition patterns in accordance with predetermined application or deposition parameters which are different than those characteristic of the system of FIG. 1.

Obviously, many modifications and variations of the present invention are possible in light of the above teachings. It is therefore to be understood that within the scope of the appended claims, the present invention may be practiced otherwise than as specifically described herein.

I claim:

1. An applicator head for the metered release of flowing media, comprising:

a housing;

a rocker pivotally mounted within said housing about a rocker axis and having a pair of oppositely extending rocker arms disposed upon opposite sides of said rocker axis;

a valve element operatively connected to each one of said rocker arms; and first and second piezoelectric means disposed upon said opposite sides of said rocker axis and respectively operatively connected to said pair of rocker arms for selectively moving said rocker in a predetermined angular direction about said rocker axis such that When a first one of said first and second piezoelectric means is activated, a first one of said pair of rocker arms causes a first one of said valve elements to open while a second one of said pair of rocker arms causes a second one of said valve elements to close, while when a second one of said first and second piezoelectric means is activated, said second one of said pair of rocker arms causes said second one of said valve elements to open while said first one of said pair of rocker arms causes said first one of said valve elements to close.

2. An applicator head as set forth in claim 1, wherein:

each one of said first and second piezoelectric means comprises a stack of piezoelectric elements.

3. An applicator head as set forth in claim 1, wherein:

said valve elements are respectively operatively connected to distal end portions of said rocker arms.

4. An applicator head as set forth in claim 1, wherein:

said first one of said valve elements comprises an applicator valve from which a flowing media can be discharged so as to be deposited upon a substrate when said first one of said valve elements is opened; and said other second one of said valve elements is a recirculation valve for recirculating said flowing media through a recirculation system so as to prevent pressure build-up of said flowing media within the vicinity of said applicator valve such that whenever said flowing media is discharged from said applicator valve, the deposition of said flowing media onto said substrate is substantially uniform.

5. An applicator head as set forth in claim 1, wherein:

both of said valve elements comprise applicator valves from which a flowing media can be discharged at alternative times so as to be deposited upon a substrate when a particular one of said valve elements is selectively opened.

6. An applicator head as set forth in claim 4, wherein said recirculation system comprises;

feed channel means fluidically connected to each one of said valve elements;

a supply tank for containing a supply of said flowing media;

first conduit means fluidically interconnecting said supply tank to said feed channel means;

second conduit means fluidically interconnecting said recirculation valve to said supply tank; and pump means disposed within said first conduit means for supplying said flowing media to said feed channel means.

7. An applicator head as set forth in claim 1, further comprising:

a rocker joint pivotally mounting said rocker within said housing and at said rocker axis.

8. An applicator head as set forth in claim 1, wherein:

said housing comprises first and second parts vertically separated from each other;

said rocker is mounted within said first housing part which is disposed vertically above said second housing part;

said second housing part comprises valve seats for operative cooperation with said valve elements; and said valve elements are connected to said oppositely extending rocker arms by valve rods which extend from said rocker arms disposed within said first housing part to said valve elements disposed within said second housing part.

9. An applicator head as set forth in claim 8, further comprising:

heating means disposed within said second lower housing part for heating said second lower housing part to a predetermined temperature level;

temperature sensor means disposed within said second lower housing part for sensing the temperature level of said second lower housing part; and thermal insulating means interposed between said first and second housing parts for thermally isolating said first upper housing part from said second lower housing part.

10. An applicator head as set forth in claim 1, further comprising:

electronic means electrically interconnecting said piezoelectric means disposed upon said opposite sides of said rocker axis and comprising charge pump means for transferring electrical energy from one of said piezoelectric means disposed upon one side of said rocker axis to the other one of said piezoelectric means disposed upon the other side of said rocker axis.

11. An applicator head as set forth in claim 10, further comprising:

an internal power supply for supplying additional electrical energy so as to compensate for heat and mechanical losses attendant actuation of said piezoelectric means.

12. An applicator head as set forth in claim 4, further comprising:

power supply means for determining the disposition of said application valve and for ensuring closure of said application valve under power failure conditions.

13. An applicator head for the metered release of flowing media, comprising:

a housing;

a rocker pivotally mounted within said housing about a rocker axis and having a pair of oppositely extending rocker arms disposed upon opposite sides of said rocker axis;

a valve element operatively connected to each one of said rocker arms; and first and second piezoelectric means disposed upon said opposite sides of said rocker axis and respectively operatively connected to said pair of rocker arms for selectively pivoting said rocker in predetermined opposite angular directions about said rocker axis such that when a first one of said first and second piezoelectric means is activated, said rocker is moved in a clockwise direction whereby a first one of said pair of rocker arms causes a first one of said valve elements to open while a second one of said pair of rocker arms causes a second one of said valve elements to close, while when a second one of said first and second piezoelectric means is activated, said rocker is moved in a counterclockwise direction whereby a second one of said pair of rocker arms causes said second one of said valve elements to open while said first one of said pair of rocker arms causes said first one of said valve elements to close.

14. An applicator head as set forth in claim 13, wherein:

each one of said first and second piezoelectric means comprises a stack of piezoelectric elements.

15. An applicator head as set forth in claim 13, wherein:

said valve elements are respectively operatively connected to distal end portions of said rocker arms.

16. An applicator head as set forth in claim 13, wherein:

said first one of said valve elements comprises an applicator valve from which a flowing media can be discharged so as to be deposited upon a substrate when said first one of said valve elements is opened; and said second one of said valve elements is a recirculation valve for recirculating said flowing media through a recirculation system so as to prevent pressure build-up of said flowing media within the vicinity of said applicator valve such that whenever said flowing media is discharged from said applicator valve, the deposition of said flowing media onto said substrate is substantially uniform.

17. An applicator head as set forth in claim 13, wherein:

both of said valve elements comprise applicator valves from which a flowing media can be discharged at alternative times so as to be deposited upon a substrate when a particular one of said valve elements is selectively opened.

18. An applicator head as set forth in claim 16, wherein said recirculation system comprises:

feed channel means fluidically connected to each one of said valve elements;

a supply tank for containing a supply of said flowing media;

first conduit means fluidically interconnecting said supply tank to said feed channel means;

second conduit means fluidically interconnecting said recirculation valve to said supply tank; and pump means disposed within said first conduit means for supplying said flowing media to said feed channel means.

19. An applicator head as set forth in claim 13, wherein:

said housing comprises first and second parts vertically separated from each other;

said rocker is mounted within said first housing part which is disposed vertically above said second housing part;

said second housing part comprises valve seats for operative connection with said valve elements; and said valve elements are connected to said oppositely extending rocker arms by valve rods which extend from said rocker arms disposed within said first housing part to said valve elements disposed within said second housing part.

20. An applicator head as set forth in claim 19, further comprising:

heating means disposed within said second lower housing part for heating said second lower housing part to a predetermined temperature level;

temperature sensor means disposed within said second lower housing part for sensing the temperature level of said second lower housing part; and thermal insulating means interposed between said first and second housing parts for thermally isolating said first upper housing part from said second lower housing part.

* * * * *